UNITED STATES PATENT OFFICE.

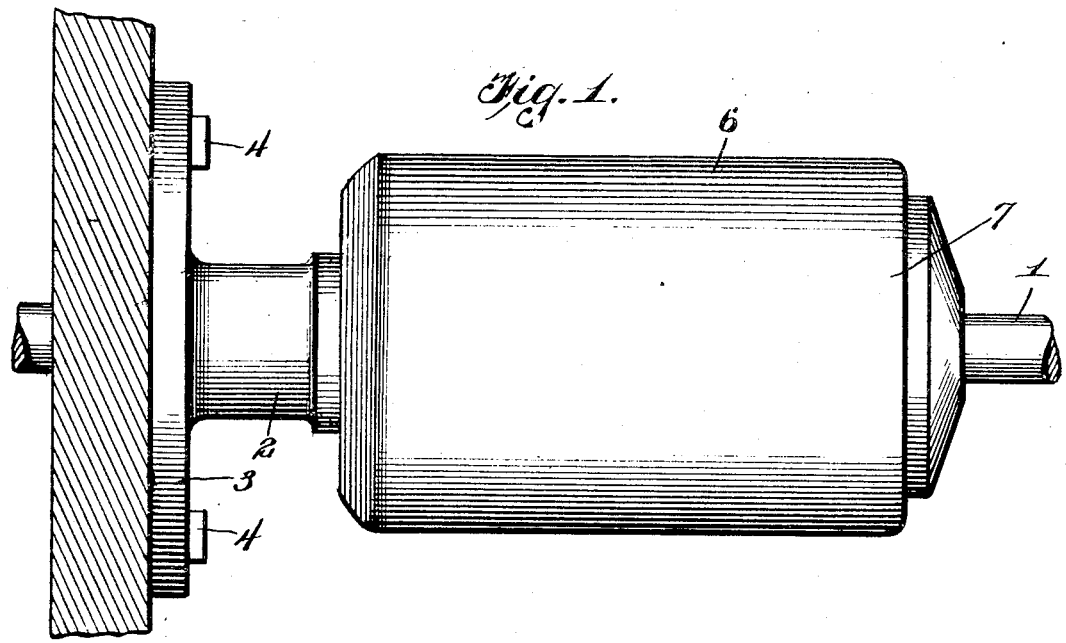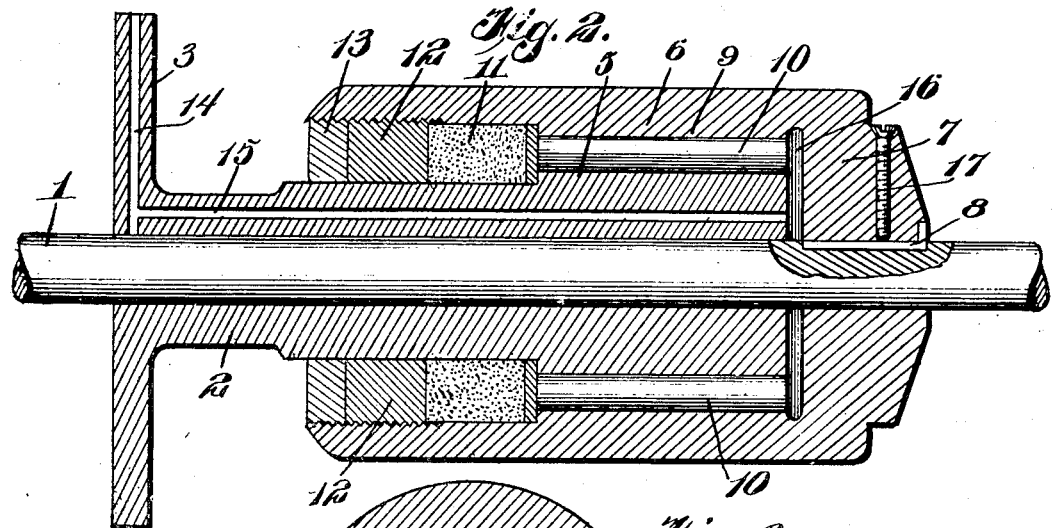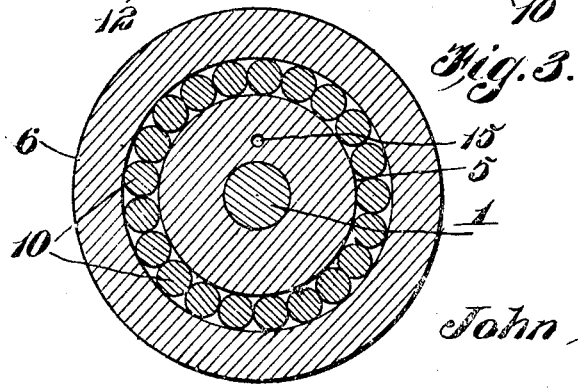

JOHN B. STELZER, OF MIAMI, FLORIDA.

STERN-BEARING.

1,098,187.  Specification of Letters Patent.  Patented May 26, 1914.

Application filed April 26, 1913. Serial No. 763,818.

*To all whom it may concern:*

Be it known that I, JOHN B. STELZER, a citizen of the United States, residing at Miami, in the county of Dade and State of Florida, have invented new and useful Improvements in Stern-Bearings, of which the following is a specification.

This invention relates to improvements in bearings and has particular application to stern bearings for the propelling shaft of boats and other water craft.

In carrying out the present invention, it is my purpose to provide a bearing of the class described whereby the propeller shaft will be held in proper position and a fluid tight joint effected at the point where the shaft leaves the boat.

It is also my purpose to provide a stern bearing for propeller shafts which will be constructed in such manner that the bearing and shaft may be at all times lubricated so that the rotatable parts of the bearing may move freely under the action of the shaft.

Furthermore, I aim to provide a bearing of the type set forth which will embrace the desired features of simplicity, efficiency and durability and which may be manufactured, installed and maintained at a minimum expense.

With the above and other objects in view, the invention consists in the construction, combination and arrangement of parts hereinafter set forth in and falling within the scope of the claim.

In the accompanying drawing, Figure 1 is a fragmentary longitudinal sectional view through the stern of a boat equipped with the present invention. Fig. 2 is a longitudinal sectional view through the bearing, and Fig. 3 is a transverse sectional view therethrough.

Referring now to the accompanying drawing in detail, the numeral 1 designates the propeller shaft arranged longitudinally of a vessel and connected at one end to a suitable engine or driving motor and having the opposite end thereof projected outwardly of the stern of the boat and equipped with the usual propeller blades.

In the present instance, my improved stern bearing comprises a sleeve 2 encircling the shaft 1 at the stern of the boat and provided at one end with a circumferentially extending flange 3 bolted or otherwise fastened as at 4 to the inner side of the stern and disposed concentrically of the opening through which the propeller shaft passes. The outer surface of the sleeve 2 adjacent to the forward end thereof is circumferentially enlarged as at 5, while surrounding the sleeve concentrically thereof and spaced apart therefrom is a second cylindrical sleeve 6 having the forward end thereof provided with an inwardly extending flange 7 surrounding the shaft 1 and fastened thereto through the medium of a key 8 so that in the rotation of the shaft similar motion will be imparted to the sleeve 6. The forward end portion of the inner wall of the sleeve 6 above the circumferential enlargement 5 of the sleeve 2 is circumferentially reduced as at 9 and such reduced portion coöperates with the enlarged portion 5 of the first sleeve to form a race way for bearing rollers 10 or other anti-friction devices so that the outer sleeve of the bearing will be supported by and capable of rotating freely about the inner sleeve.

Interposed between the inner and outer sleeves 2 and 6 respectively immediately at the rear of the bearing rollers 10 is a suitable packing 11, while threadedly engaging the open end of the outer sleeve and surrounding the inner sleeve is a packing nut 12 designed to compress the packing 11 between the shoulders formed by the circumferentially enlarged and reduced portions of the inner and outer sleeves respectively and the inner end of the packing nut, while a jam nut 13 surrounds the packing nut and threadedly engages the same to hold such packing nut 12 against accidental displacement.

In the present instance, the flange 3 on the rear end of the inner sleeve 2 is formed with an oil passage 14 communicating with a number of passages 15 formed in the inner sleeve and extending longitudinally thereof and spaced apart about the shaft 1, the forward extremities of the passages 15 opening into a common chamber 16 formed between the inwardly extending flange 7 on the outer sleeve and the confronting edge of the inner sleeve, the passage 14 terminating at its inner end upon the inner wall of the sleeve 2. By means of this construction, it will be seen that the shaft 1 is at all times lubricated so as to freely rotate within the sleeve 2 of the bearing, while the rollers 10 are at all times supplied with a lubricant so that the outer sleeve may rotate about the inner sleeve. In the present instance, the key 8 is held against displacement by means of a set screw 17 threadedly engaged in a bore in the outer sleeve 6 and having the inner end thereof bearing upon the key.

From the foregoing description taken in connection with the accompanying drawing, the construction, mode of operation and manner of employing my improved stern bearing will be readily apparent. It will be seen that I have provided a stern bearing for water craft whereby the shaft is at all times held in proper line and capable of rotating with ease and facility, while a fluid tight joint is effected at the point where the shaft leaves the stern of the vessel and enters the water.

I claim:

In a stern bearing, the combination with a propeller shaft, of a sleeve surrounding said shaft and rotatably receiving the same, a supporting flange formed on one end of said sleeve, a second sleeve disposed concentrically of said first sleeve and spaced apart therefrom, an inwardly extending flange on the end of said last sleeve opposite the flanged end of the first-mentioned sleeve, a fixed connection between said inwardly extending flange and shaft, anti-friction bodies interposed between said sleeves whereby the last-mentioned sleeve may rotate with the shaft and about the first sleeve, a packing disposed within the other end of said last sleeve, and a packing nut threaded into the last-mentioned end of said last sleeve.

In testimony whereof I affix my signature in presence of two witnesses.

JOHN B. STELZER.

Witnesses:
AGNES ZETROUER,
JAMES T. SANDERS.